US007004152B2

(12) United States Patent
Manalo

(10) Patent No.: US 7,004,152 B2
(45) Date of Patent: Feb. 28, 2006

(54) DEVICE FOR REFORMING GAS VAPORS OF AN INTERNAL COMBUSTION ENGINE

(76) Inventor: Romeo L. Manalo, 26035 Brookmere Ave., Loma Linda, CA (US) 92354

( * ) Notice: Subject to any disclaimer, the term of this patent is extended or adjusted under 35 U.S.C. 154(b) by 0 days.

(21) Appl. No.: 10/822,162

(22) Filed: Apr. 12, 2004

(65) Prior Publication Data
US 2005/0224017 A1 Oct. 13, 2005

(51) Int. Cl.
F02M 27/04 (2006.01)

(52) U.S. Cl. .................................... 123/536

(58) Field of Classification Search ............. 123/2, 123/536, 537, 538, 572, 573, 574

See application file for complete search history.

(56) References Cited

U.S. PATENT DOCUMENTS

| 4,091,779 A | * | 5/1978 | Saufferer et al. | .......... 123/536 |
| 4,355,969 A | * | 10/1982 | Nelson et al. | .................. 431/4 |
| 5,010,869 A | * | 4/1991 | Lee | ............... 123/539 |
| 5,154,142 A | * | 10/1992 | Kamo | ....................... 123/25 F |
| 5,992,397 A | * | 11/1999 | Hideaki et al. | .............. 123/538 |

* cited by examiner

Primary Examiner—Henry C. Yuen
Assistant Examiner—Jason Benton

(57) ABSTRACT

A device for reforming gas vapors of an internal combustion engine having an air induction system, a combustion chamber, and positive crankcase and fuel tank associated therewith, the device comprising a voltage multiplier unit, a gas vapor treatment means and a gas vapor reforming means disposed within the gas vapor treatment means and in communication with said voltage multiplier unit, characterized in that said gas vapor treatment means having a treatment chamber in communication with a gas vapor intake port and gas vapor discharge port, gas vapor intake port being capable of communicating with said positive crankcase and fuel tank and said gas vapor discharge port being capable of communicating with said air induction system, said gas vapor reforming means is an electronic emitter disposed within the treatment chamber defining therein a first chamber section and a second chamber section each having predetermined volumetric area suitable of providing ample space for complete and effective dissociation of gas vapor ions therein, and a plurality of gas vapor passages provided on said electronic emitter, said electronic emitter being capable of introducing electrons within the treatment chamber such that the gas vapor coming from the positive crankcase and fuel tank will be reformed within the treatment chamber, said electronic emitter further having a capacity of between approximately 5 KV and approximately 7 KV of electromotive force, and said voltage multiplier unit having a variable voltage capacity being capable of introducing said between approximately 5 KV and approximately 7 KV of electromotive force to the electronic emitter.

5 Claims, 3 Drawing Sheets

DEVICE FOR REFORMING GAS VAPORS OF AN INTERNAL COMBUSTION ENGINE

BACKGROUND OF THE INVENTION

The present invention relates generally to enhancement of internal combustion engine performance and more specifically to a device for reforming vented out gases, to produce ionized hydrocarbon gas vapors, adapted to be fed back to the combustion chamber of the engine to enhance its combustion performance.

The present invention is actually an improvement of the Method and Apparatus for reforming gas vapor of an internal combustion engine disclosed in U.S. Pat. No. 6,502,562 and pending PH Patent application bearing Application No. 1-2001-00926 under the same inventor.

Said patent discloses an apparatus for reforming gas vapor of an internal combustion engine comprising a gas vapor treatment chamber for reforming the gas vapors coming from the positive crankcase and fuel tank vent of the internal combustion engine system, and subsequently feeding the reformed vapors to the combustion chamber of the engine, and an emitter for introducing electrons within a gas vapor treatment chamber to produce dissociation of ions, thereby reforming the gas vapors. The emitter can be an electronic emitter having a capacity of 10 KV to 40 KV of electromotive force being supplied by a conventional voltage multiplier unit. The gas vapor treatment chamber is provided with a gas vapor intake for connection to the positive crankcase and fuel tank vents of the internal combustion engine system, and a gas discharge port being in communication with the air induction system of the internal combustion engine system.

The gas vapor treatment chamber can form a main passage for receiving intake air together with gas vapor from the positive crankcase and fuel tank vents from a portion of the air intake system, the air and vapors as reformed is then fed to the combustion chamber of the engine.

The vented out hydrocarbon gas vapors from the fuel tank and the hydrocarbons including radical hydrogen gas vapors from the positive crankcase ventilation (PCV) of an internal combustion engine system are made to pass through the treatment chamber. These dense and partially positive gas vapors are bombarded with a massive amount of electrons (mass spectra) coming from the emitter derived from approximately 10 KV to 40 KV of electric voltage supplied by the voltage multiplier unit.

Dissociation of ions occurs resulting in negatively and positively charged ions composing the reformed hydrocarbon gas vapor. These reformed hydrocarbon gas vapors are highly potent and are then oxidized by allowing them to mix with the air/fuel mixture in the air induction system of the engine, which is then introduced in the combustion chamber. Since the reformed hydrocarbon gas vapors are highly potent, combustion is greatly enhanced, thus resulting in improved engine efficiency performance and increased engine power. Furthermore, fuel consumption is greatly reduced and smoke emission, which is highly detrimental to the environment, is eliminated.

While the aforesaid method and apparatus has been observed to improve significantly the performance of internal combustion engines, it has been observed that utilization of 10 KV to 40 KV of electric voltage causes a great number of radical ions to be lost due to over ionizing. Such occurrence results in an imperfect reformation of the gas vapor. Furthermore, the voltage multiplier unit of the prior art is mounted in an abutting relation to the treatment chamber such that a wider space is needed in mounting the assembly. Withstanding also the fact that making the mold for such disposition is very tedious and quite expensive. Also, holding the plurality of needles or whiskers within the treatment chamber requires multiple insulative elements imbedded in the treatment chamber, which makes the connection too complicated. It has been further observed that the area of the treatment chamber is very critical in the reforming process, such that a suitable and perfectly designed chamber area will results in good reforming of ions.

SUMMARY OF THE INVENTION

The primary object of the present invention is to provide a device for reforming gas vapor that can remedy the aforesaid drawbacks. The device as herein disclosed includes the utilization of a voltage multiplier unit with a capacity 5 KV to 7 KV of electromotive force such that over ionizing can be prevented. The voltage capacity of the voltage multiplier unit may be so designed as to fix the required specific voltage within the aforesaid range or can be varied from said 5 KV to 7 KV. Furthermore, a conductive material is provided within the treatment chamber adapted for holding the needles or whiskers thereto. This conductive material, which include a piece of circuit board, metal or aluminum, is utilized such that if a plurality of needles is required within the treatment chamber to increase the ionizing process, the current can be distributed to every needles.

Other objects and advantages of the present invention can be realized upon reading the following description taken in conjunction with the accompanying drawings.

DETAILED DESCRIPTION OF THE INVENTION

Figure 1:
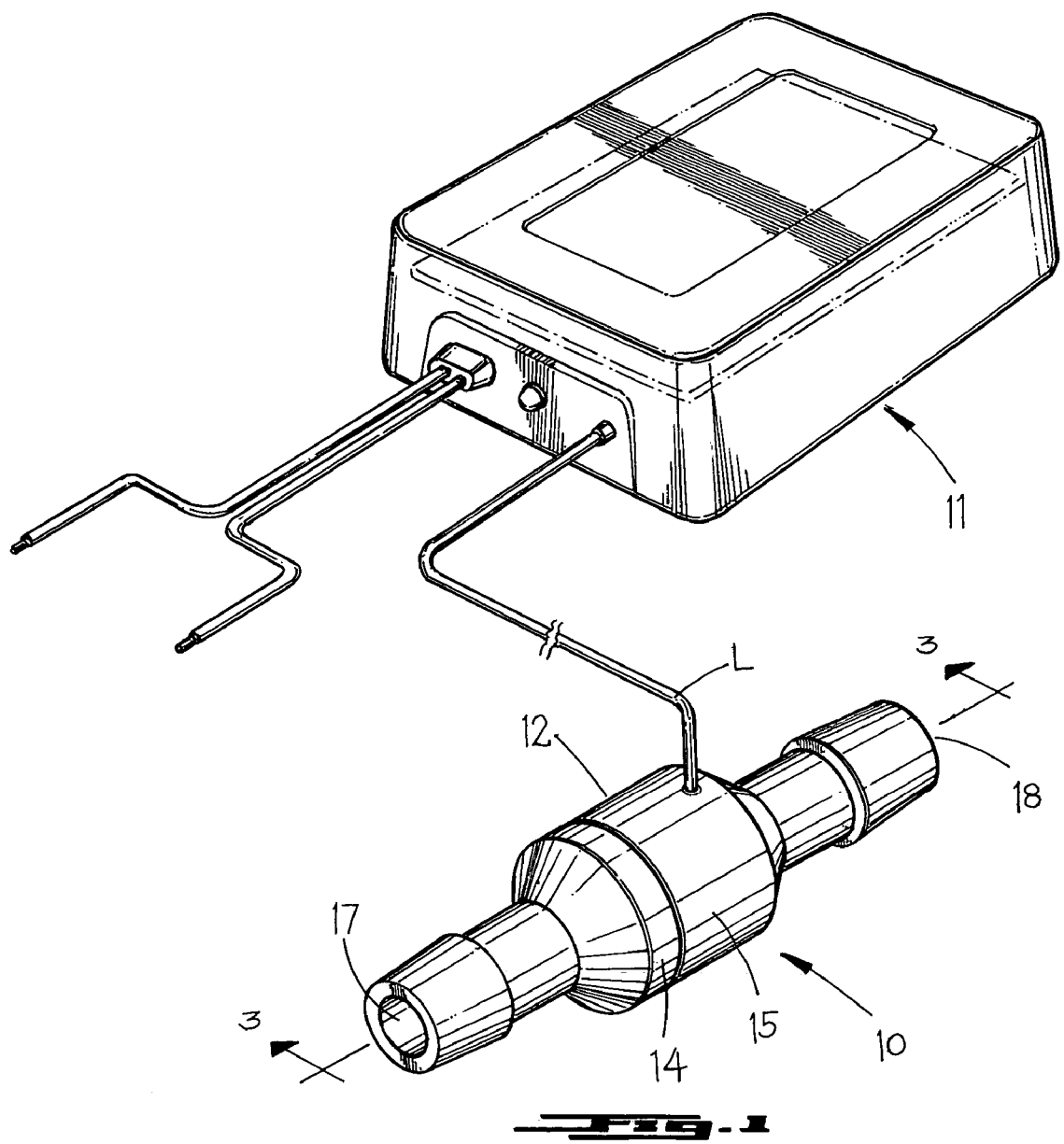
FIG. 1 is a perspective view of the device of the present invention.

Referring to the drawings, there is shown a device for reforming gas vapors of an internal combustion engine generally designated as 10 comprising a voltage multiplier unit 11, a gas vapor treatment means 12, and a gas vapor reforming means 13 disposed within the gas vapor treatment means and in communication with said voltage multiplier unit. Voltage multiplier unit 11 is adapted to be connected to the battery of an internal combustion engine system and the gas vapor treatment means being in communication with the positive crankcase ventilation P, fuel tank vent T and air induction system A of the internal combustion engine. Said gas vapor treatment means 12 is a hollow body being capable of receiving and discharging gas vapor. It may be formed by a pair of hollow pieces 14 and 15 being connected to each other defining a treatment chamber 16. A constricted gas vapor intake port 17 provided on one of said pieces and a constricted reformed gas vapor discharge port 18 disposed on the other piece, both in communication with said treatment chamber. To gas vapor intake port is adapted to be connected the positive crankcase ventilation P and fuel tank vent T, and to gas vapor discharge port is adapted to be connected the air induction system A of the engine. Treatment chamber 16 having a diameter of ¾ inches to 3 inches and a length of 1 and ½ inches to 5 inches measured between the gas vapor intake port and gas vapor discharge port. Being held within chamber 16 is the gas vapor reforming means 13, which is preferably an electronic emitter having the capacity of emitting high potential at the tip of one or more needles or whiskers through passage of a high electromotive force derive from the low voltage electrical system of the engine. The gas vapor reforming means 13 may be in any suitable position within the treatment chamber provided it can effectively introduce massive amount of electrons therein and capable of dissociating ions that would result in reformed hydrocarbon gas vapors. According to a preferred embodiment of the present invention, the gas vapor reforming means is an electronic emitter consisting of a conductive piece 22 having a plurality of notches 23 provided at the edges thereof, and a plurality of electron needles or whiskers 24 spacedly held on conductive piece 22. Said conductive piece 22 is disposed within the treatment chamber in a manner wherein it serves as a dividing wall therein and defines a first chamber section F and a second chamber section H. The first chamber section F serves as the untreated gas vapor section and the second chamber section H serves as the reformed gas vapor section. First and second chamber section F and H having predetermined volumetric area suitable for completely treating the gas vapors therein before it flows to the reformed gas vapor discharge port and unto the air induction system of the engine. Conductive piece 22 is provided with notches which defines gas passages G in relation to the inner wall of the treatment chamber. Gas passages G may also be in the form of a plurality of spaced holes or slots disposed on the conductive piece. Conductive piece 22 being in communication with the voltage multiplier unit through an electrical line L passing through the treatment chamber. Said conductive piece is preferably a conductive material that includes circuit board, metal, and aluminum, such that it is capable of transferring the current to every needle or whisker being held thereof.

Figure 2:
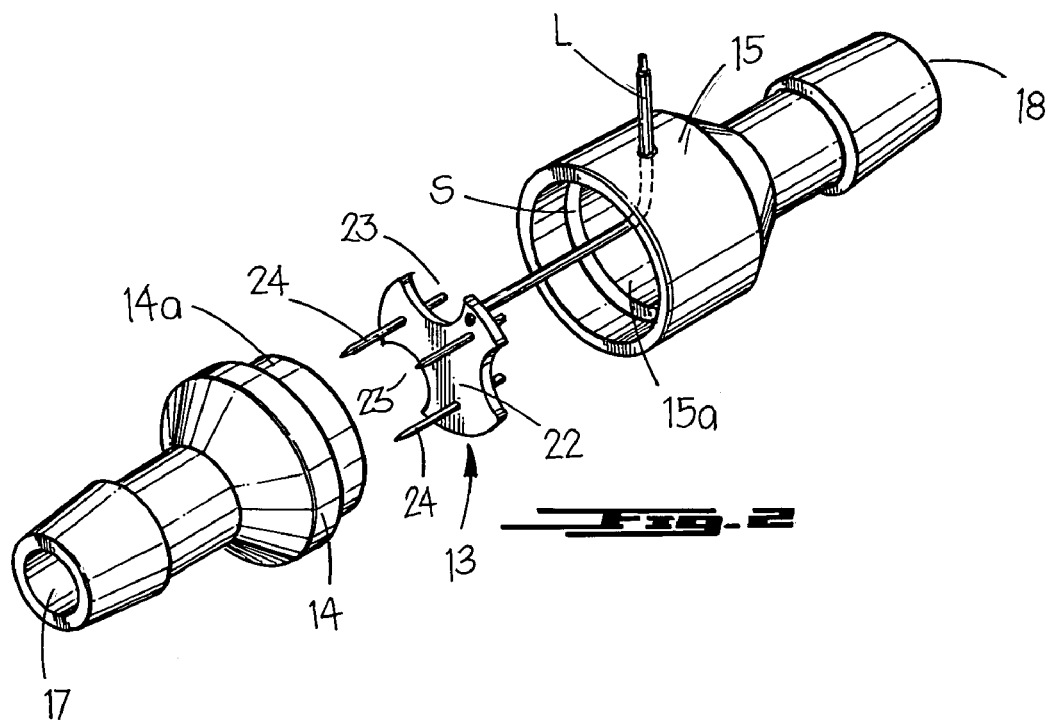
FIG. 2 is an exploded view of the gas vapor treatment means of the present invention with a gas vapor reforming means being held therein.
Figure 3:
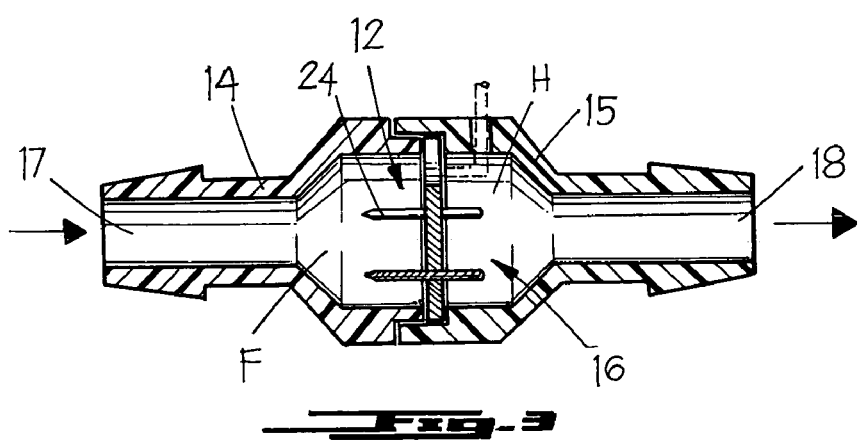
FIG. 3 is a cross-sectional view taken along line 3—3 of FIG. 1.

As shown in FIGS. 2 and 3, snug fit attachment of the two hollow pieces 14 and 15 is facilitated by expanding the annular inner surface 15a of the rear portion of one of the pieces such that a shoulder S is formed thereof, and the outer annular surface 14a of the rear portion of the other piece is reduced at a diameter in conformity with the inner diameter of the former. Suitable adhesive may be provided to firmly and tightly maintain the engagement. Furthermore, positioning it in-between the opposing edges of the two hollow pieces facilitates maintaining the conductive piece 22 within the chamber. However, other means of attachment can be used provided the conductive piece can be firmly positioned within the chamber.

Figure 4:
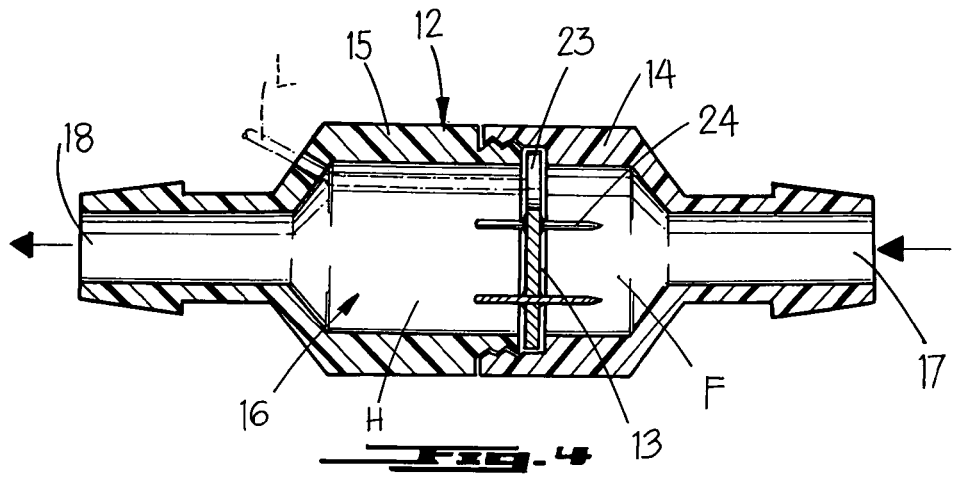
FIG. 4 is a cross-sectional view of another embodiment of the gas treatment means of the present invention.
Figure 5:
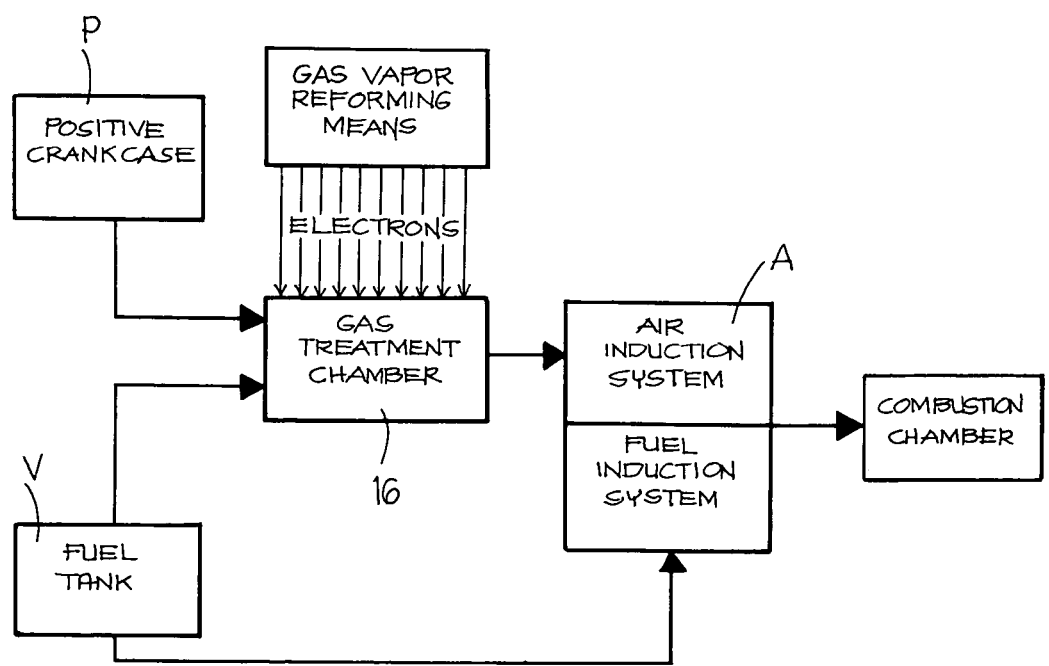
FIG. 5 is a schematic diagram showing the system of operation of the present invention.

As shown in FIG. 4, the pair of hollow pieces 14 and 15 may be shaped in a manner that both can be screwably connected to each other to facilitate easy repair and maintenance of the gas vapor reforming means disposed within the treatment chamber.

The voltage multiplier unit of the present invention may be designed such that its voltage generating capacity may be varied or fixed such that the electromotive force passing through the electron needles is within 5 KV to 7 KV or 30 to 90 micro amps. This electromotive force has been observed to be potential in introducing an ideal quantity of electrons that would completely reform the gas vapors recovered in the fuel tank and positive crankcase ventilation (PCV) of the engine.

The specific details regarding the circuit of the voltage multiplier unit is considered as already known to those having skill in the art of ionization and further discussion regarding it is considered as already obvious to those skilled in the art.

In operation, the vented out hydrocarbon gas vapors from the fuel tank and hydrocarbons including radical hydrogen gas vapors from the positive crankcase ventilation (PCV) of an internal combustion engine system are recovered and made to pass through the treatment chamber. These less dense and partially positive gas vapors are then bombarded with massive amount of electrons (mass spectra) formed by operating the emitter at a predetermined voltage that would introduce from approximately 5 KV to approximately 7 KV of electromotive force.

Dissociation of ions occurs resulting in negatively and positively charged ions composing the reformed hydrocarbon gas vapors. These reformed hydrocarbon gas vapors are highly potent and are then oxidized by allowing them to mix with the air/fuel mixture in the air induction system A of the engine, which is then introduced in the combustion chamber. Since the reformed hydrocarbon gas vapors are highly potent, combustion is greatly enhanced, thus resulting in improved engine efficiency performance and increased engine power. Furthermore, fuel consumption is greatly reduced and smoke emission, which is highly detrimental to the environment, is eliminated.

Said current range has been tested to provide an ideal reforming of gas vapor as proven by the tests conducted on a Volvo car model 1987. The results, which are presented in the succeeding tables, have been observed to verify the improved combustion efficiency of the engine.

TABLE 1

SATURN GALANT MODEL 2002
Engine size: 1.9 L

|  | Without the device Odometer reading | With the device Odometer reading |
|---|---|---|
| Start | 64,700 | 65,410 |
| Ending | 64,998 | 65720 |
| Total miles | 298 miles | 310 miles |
| Total fuel | 11.04 gal. | 9.51 gal. |
| Ave. miles/gal. | 27 miles/gal. | 32.6 miles |
| Savings: | 5.6 miles/gal or 20.7% | |

TABLE 11

Mitsubishi Galant model 2002
Engine size: 2.4 L

| Baseline: | |
|---|---|
| Start Odometer reading = | 8,248 miles |
| End Odometer reading = | 8548 miles |
| Total miles = | 300 miles |
| Total fuel = | 11.54 gallons |
| Ave. mile/gal = | 26 miles/gal |
| With the device: | |
| Start Odometer reading: | 9410 |
| End Odometer reading: | 9720 |
| Total miles = | 310 miles |

TABLE 11-continued

Mitsubishi Galant model 2002
Engine size: 2.4 L

| | |
|---|---|
| Total fuel = | 10 gal. |
| Ave. mile/gal. = | 31 miles/gal. |
| Savings: | |
| 31 miles/gal.–26 miles/gal. = | 5 miles/gal. Or 19% |

It can be seen in the above tables that a significant savings in terms of fuel can be achieved by the utilization of the present device.

While the present invention has been described in detail with reference to the preferred embodiment, the spirit and scope of the appended claims should not be limited to the description of the preferred versions contained therein.

I claim:

1. A device for reforming gas vapors of an internal combustion engine having an air induction system, a combustion chamber, and positive crankcase and fuel tank associated therewith, the device comprising a voltage multiplier unit, a gas vapor treatment means and a gas vapor reforming means disposed within the gas vapor treatment means and in communication with said voltage multiplier unit, characterized in that said gas vapor treatment means having a treatment chamber in communication with a gas vapor intake port and gas vapor discharge port, gas vapor intake port being capable of communicating with said positive crankcase and fuel tank and said gas vapor discharge port being capable of communicating with said air induction system, said gas vapor reforming means is an electronic emitter disposed within the treatment chamber defining therein a first chamber section and a second chamber section each having predetermined volumetric area suitable of providing ample space for complete and effective dissociation of gas vapor ions therein, and a plurality of gas vapor passages provided on said electronic emitter, said electronic emitter being capable of introducing electrons within the treatment chamber such that the gas vapor coming from the positive crankcase and fuel tank will be reformed within the treatment chamber, said electronic emitter further having a capacity of between approximately 5 KV and approximately 7 KV of electromotive force, and said voltage multiplier unit having a variable voltage capacity being capable of introducing said between approximately 5 KV and approximately 7 KV of electromotive force to the electronic emitter.

2. The device of claim 1 wherein the voltage capacity of the voltage multiplier unit is fixed at a voltage capacity suitable for introducing said between approximately 5 KV and approximately 7 KV of electromotive force to the electronic emitter.

3. The device of claim 1, wherein said gas vapor treatment means is a hollow body defined by a pair of fixedly connected pieces.

4. The device of claim 1 wherein said electronic emitter consisting of a conductive piece having a plurality of electron needles provided thereof, said conductive piece being capable of transferring the electromotive force supplied by the voltage multiplier unit to the said electron needles and disposed within the treatment chamber in a manner wherein it can facilitate introduction of electrons for complete reforming of the gas vapors therein.

5. The device of claim 4, wherein said conductive piece is preferably made of materials that include circuit board, aluminum, metal.

* * * * *